US009657976B2

(12) United States Patent
Pebley et al.

(10) Patent No.: US 9,657,976 B2
(45) Date of Patent: May 23, 2017

(54) VEHICULAR HVAC SYSTEM WITH MODIFIED AIR RECIRCULATION FOR START-STOP ENGINE

(71) Applicant: FORD GLOBAL TECHNOLOGIES, LLC, Dearborn, MI (US)

(72) Inventors: Kirk R. Pebley, Novi, MI (US); Ranganathan Madhavan, Canton, MI (US); Eric G. Schaefer, Farmington Hills, MI (US); Manfred Koberstein, Troy, MI (US); James C. Rollinson, Superior Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1040 days.

(21) Appl. No.: 13/710,832

(22) Filed: Dec. 11, 2012

(65) Prior Publication Data

US 2014/0157803 A1    Jun. 12, 2014

(51) Int. Cl.
*F25B 49/02* (2006.01)
*B60H 1/00* (2006.01)
*F25B 41/00* (2006.01)
*F25B 27/00* (2006.01)

(52) U.S. Cl.
CPC ........... *F25B 41/00* (2013.01); *B60H 1/0075* (2013.01); *B60H 1/00778* (2013.01); *B60H 1/00785* (2013.01); *B60H 1/00849* (2013.01); *F25B 27/00* (2013.01); *F25B 49/022* (2013.01); *F25B 2327/001* (2013.01); *F25B 2600/0251* (2013.01); *F25B 2700/2106* (2013.01)

(58) Field of Classification Search
CPC ............ B60H 1/00849; B60H 1/00835; B60H 1/0075
See application file for complete search history.

(56) References Cited

U.S. PATENT DOCUMENTS

| | | | | |
|---|---|---|---|---|
| 5,301,515 A | * | 4/1994 | Iritani et al. | 62/126 |
| 5,971,844 A | * | 10/1999 | Samukawa et al. | 454/75 |
| 6,155,061 A | * | 12/2000 | Davis et al. | 62/176.6 |
| 6,170,274 B1 | * | 1/2001 | Ichishi et al. | 62/179 |
| 6,330,909 B1 | * | 12/2001 | Takahashi et al. | 165/202 |
| 6,330,979 B2 | * | 12/2001 | Yamashita et al. | 237/12.3 R |

(Continued)

*Primary Examiner* — Ljiljana Ciric
*Assistant Examiner* — Alexis Cox
(74) *Attorney, Agent, or Firm* — Raymond L. Coppiellie; MacMillan, Sobanski & Todd, LLC

(57) ABSTRACT

A method and apparatus controls a recirculation position of a return vent in an HVAC system for a vehicle with a compressor driven by a start/stop engine. A partial recirculation position is set according to a basic recirculation strategy while the engine is operating. An auto stop event is entered at a time with the compressor operating. A full recirculation position is set during the stop event by an HVAC controller if a plurality of low fogging probability indicators are true. The low fogging probability indicators include a sensed ambient temperature being above a predetermined temperature, a sensed state of a windshield wiper being an off state, and a sensed sunload being above a predetermined sunload. The return vent is set at other than the full recirculation position by the HVAC controller according to the basic recirculation strategy if the low fogging probability indicators are not true.

9 Claims, 3 Drawing Sheets

(56) References Cited

U.S. PATENT DOCUMENTS

| | | | |
|---|---|---|---|
| 6,988,371 B2 | 1/2006 | Salim et al. | |
| 7,240,660 B1 | 7/2007 | Bryant et al. | |
| 7,908,877 B2 * | 3/2011 | Carlson et al. | 62/157 |
| 7,958,740 B2 * | 6/2011 | Hirai et al. | 62/150 |
| 2005/0193747 A1 * | 9/2005 | Kajimoto et al. | 62/133 |
| 2007/0246209 A1 * | 10/2007 | Lee et al. | 165/202 |
| 2008/0076342 A1 | 3/2008 | Bryanet et al. | |
| 2010/0138139 A1 | 6/2010 | Gibert et al. | |
| 2012/0009859 A1 * | 1/2012 | Wijaya et al. | 454/75 |
| 2012/0234930 A1 * | 9/2012 | Wijaya | 236/51 |
| 2013/0030679 A1 * | 1/2013 | Wakou et al. | 701/113 |
| 2013/0317728 A1 * | 11/2013 | Hall et al. | 701/113 |
| 2014/0083672 A1 * | 3/2014 | Rollinson et al. | 165/202 |
| 2014/0157803 A1 * | 6/2014 | Pebley et al. | 62/89 |

* cited by examiner

VEHICULAR HVAC SYSTEM WITH MODIFIED AIR RECIRCULATION FOR START-STOP ENGINE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automatic control of fresh or recirculated air flow into a vehicular heating, ventilating, and air conditioning (HVAC) system. More specifically, the invention relates to controlling recirculated air flow to improve efficiency for an internal combustion (IC) vehicle having start/stop capability by increasing IC engine off time.

Fuel economy of automobiles is an important attribute of vehicle performance which is determined by the technologies employed in the vehicle design, by driver behavior and actions, and by conditions under which the vehicle is used (e.g., speed, road design, weather, and traffic). Manufacturers continuously strive to deliver better fuel economy. One technology being increasingly used is known as automatic Start-Stop technology, wherein an internal combustion engine automatically shuts down when the vehicle comes to a stop or coasts and then restarts as needed to continue driving. The reduction in the amount of time the engine spends idling (e.g., while waiting at a traffic light) results in improved fuel economy and reduced emissions. According to some estimates, start-stop technology can provide a 5% to 10% improvement in fuel economy or more.

In addition to vehicle propulsion, the combustion engine drives other vehicle systems such as an air conditioning compressor. Occupant comfort must be maintained during the time that the engine is stopped. Since the air conditioning compressor typically runs on a front-end-accessory-drive (FEAD) belt driven by the engine, the conventional compressor does not run when the engine is stopped. Thus, when the air conditioning system is actively being used and the engine stops during an idle condition, the cooling action is interrupted and the passenger cabin may become warmer. If the cabin temperature increases by a certain amount, the engine is usually restarted so that cooling resumes, but some of the fuel economy improvement may be lost. One example of a strategy for controlling the engine off time is provided in commonly assigned, co-pending application U.S. Ser. No. 13/561,328, filed Jul. 30, 2012, entitled "Engine Start-Stop Control Strategy for Optimization of Cabin Comfort and Fuel Economy," which is incorporated herein by reference in its entirety.

In attempting to lengthen the time span until it becomes necessary to resume operation of the air conditioning system, the use of cold storage systems has been considered. In one type of cold storage system, an evaporator may incorporate a phase change material that gives off heat (e.g., freezes) during normal operation before a stop event and then absorbs heat by changing back to a liquid phase during the stop event. However, cold storage devices are expensive, are difficult to package due to their larger size, and require additional controls. Moreover, since they consume additional energy during engine operation, the fuel economy improvement is lessened.

Another approach for providing air conditioning while the combustion engine is off involves the use of an electric compressor running off stored electrical energy from a battery. In a typical gasoline-powered vehicle, however, the expense of such an auxiliary air conditioning system is usually prohibitive. Even in a hybrid vehicle (i.e., having both a combustion engine and an electric propulsion system), the additional use of the electric compressor would result in the loss of fuel economy. Thus, it would be desirable to maintain passenger comfort with longer engine off times without relying on cold storage or backup cooling systems.

When heating and cooling systems were first introduced, incoming fresh air was relied upon for both heating and cooling. As systems developed, a recirculation mode was introduced in which cabin air is recycled through the HVAC system since it will already have a temperature closer to the desired temperature than the outside air. Besides full recirculation, a partial recirculation mode may also be used in which an inlet mechanism adjusts a proportion of fresh air to recirculated air that is inlet to the HVAC system via the HVAC blower.

A system and method for a partial air inlet control strategy is disclosed in U.S. Patent Application Publication 2012/0009859A1, which is incorporated herein by reference. It discloses that if the air entering the HVAC is not managed carefully, fuel economy and battery consumption may not be optimized. Particularly, if the fresh air mode is selected as the source of air for the HVAC system in hot weather, this air mode will add more cooling load to the compressor and increase energy consumption. On the other hand, if the fresh air mode is selected as the source of air for the HVAC system in cold weather, this air mode will slow down heater/defrost performance. A further complication is that when the full recirculation mode is selected, window fogging may result in certain ambient conditions. Thus, partial recirculation control strategies have been developed in which the air inlet door is controlled to move progressively to partial recirculation positions by taking into account the cooling/heating loads and the probability of fogging. As cooling/heating loads increase, the air inlet door moves toward a 100% recirculation mode. As fogging probability increases, the air inlet door moves toward a 100% fresh air mode. By selectively choosing a position between 100% recirculation and 100% fresh air, fuel economy and/or battery power consumption are optimized without compromising passenger comfort or causing fogging on interior glass surfaces.

In connection with a start-stop engine, a recirculation setting with a full or partial contribution of fresh air would cause a faster warming of the air conditioning evaporator core than would occur at a full recirculation setting. However, it would be undesirable to allow any fogging of the windows to occur during an auto stop event of the engine. Therefore, the same recirculation strategy has remained in effect during stop events.

SUMMARY OF THE INVENTION

The present invention extends engine stop times by identifying conditions in which a full recirculation position can be used during a stop event without an unacceptable increase in the fogging probability.

In one aspect of the invention, a method is provided for controlling a recirculation position of a return vent in an HVAC system for a vehicle with a compressor driven by a start/stop engine. A partial recirculation position is controlled according to a basic recirculation strategy while the engine is operating. An auto stop event is entered at a time with the compressor operating. A full recirculation position is set during the stop event if a plurality of low fogging probability indicators are true. The low fogging probability indicators may include a sensed ambient temperature being above a predetermined temperature, a sensed state of a windshield wiper being an off state, and a sensed sunload being above a predetermined sunload.

DETAILED DESCRIPTION OF PREFERRED EMBODIMENTS

Figure 1:
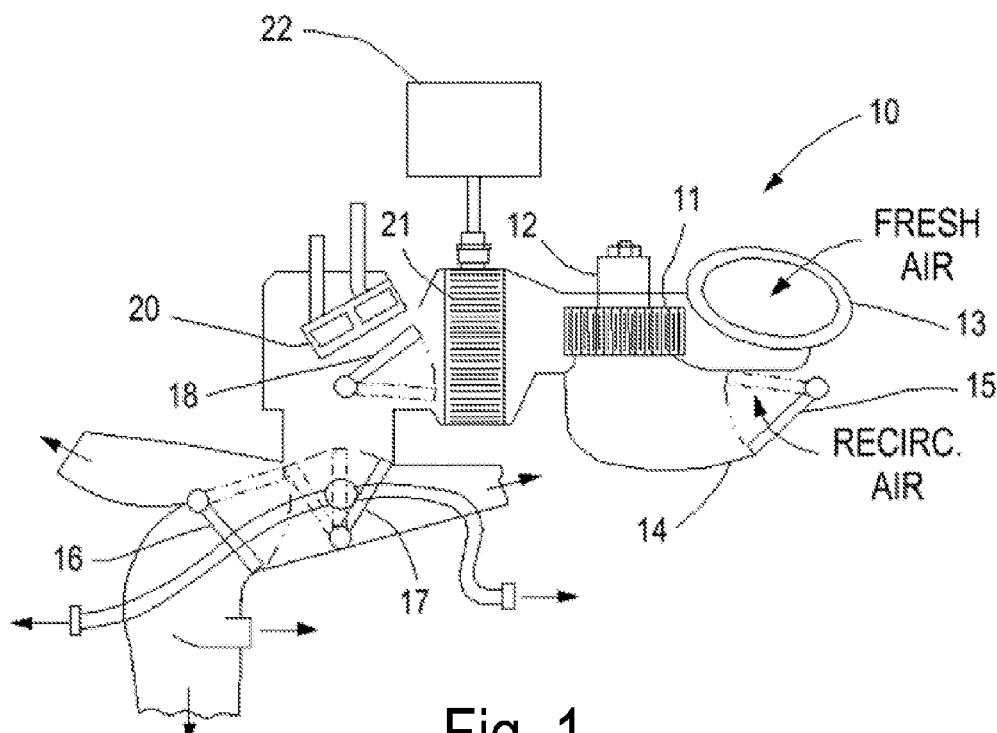
FIG. 1 is a schematic view of an HVAC air handling system capable of various recirculation settings.

FIG. 1 shows schematically an air handling system of a heating, ventilation and air conditioning (HVAC) system 10. A blower 11 driven by a blower motor 12 receives inlet air comprised of fresh air from a duct 13 and/or recirculated air from a cabin air return vent 14 as determined by a recirculation door 15. System 10 also includes a panel-defrost door 16, a floor-panel door 17, and a temperature blend door 18. Door 15 functions to regulate air passing to the inlet of blower 11 between fresh air and recirculated air. As used herein, a partial recirculation setting may be expressed as a percentage opening of door 15 (i.e., the proportional share of inlet air that is being recirculated). Thus, a higher percentage indicates a greater amount of recirculated air. Other known air flow regulating devices may be used instead of the illustrated door configuration.

The various doors are driven by any of several types of actuators (including, for example and without limitation, electric motors and vacuum controllers) in a conventional fashion. Door 15 may be preferably driven by an electric servomotor so that the position of door 15 is continuously variable.

System 10 further includes heating and cooling elements such as a heater core 20 (receiving a flow of coolant heated by an IC engine or a supplemental heat source) and an evaporator core 21 (receiving a flow of refrigerant from an air conditioning system 22). The evaporator temperature is normally controlled in a conventional automatic fashion to allow the system to dehumidify air passing thereover. System 22 includes a compressor, a condenser, a refrigerant tank, a pressure cycling switch, and an expansion device for metering refrigerant to evaporator core 21. Various ducts couple a heated/cooled air flow from HVAC 10 to various outlets and registers including panel, defrost, and demister registers as known in the art.

Figure 2:
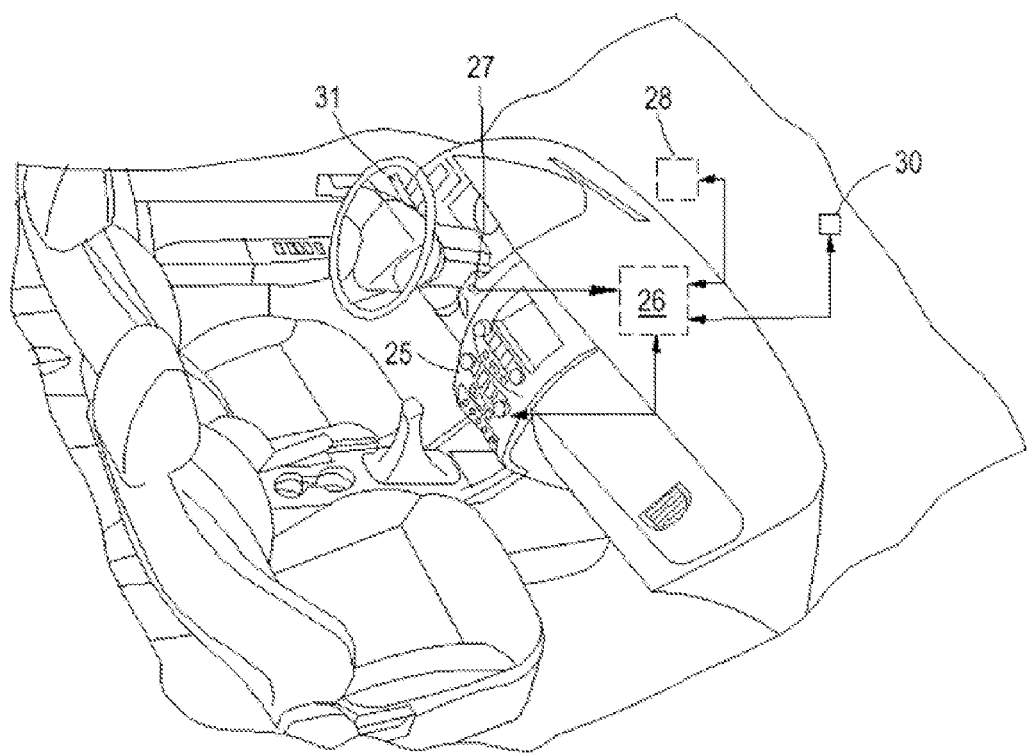
FIG. 2 is a perspective and schematic view of a vehicle apparatus according to the present invention.

For automatic control of the temperature and flow of air in the cabin, certain conditions inside and outside the cabin are monitored by sensors, some of which are shown in FIG. 2. An instrument-panel mounted HVAC control panel 25 generates user demand signals that are coupled to an HVAC controller 26 which sends appropriate command signals to control various actuators in the vehicle including the HVAC doors, the air conditioning system, the blower motor, electric window heaters, and the like. Controller 26 is coupled to sensors (either directly or through a multiplex communication bus) including an in-car temperature and humidity sensor 27 (which is typically located in the instrument panel but can be located elsewhere in the vehicle's interior). It is to be understood that temperature and humidity (or dewpoint) sensing may be done in a single sensor 27 or may be done by individual temperature and humidity sensors as is known in the art. Other sensors include a sunload sensor 28, and an ambient (outside) air temperature (OAT) sensor 30 (which is typically located in the front of the vehicle forward of the grill or elsewhere, such as associated with the vehicle's side-view mirror, bumper, or roof).

A temperature demand signal indicating a desired temperature and a blower speed setting are set manually by users via control panel 25, and these settings are sent to controller 26. Other user control actions, such as turning on the windshield wipers using a stalk switch 31 or activating an electric window heater using control panel 25 are also communicated to controller 26 which uses all this data to regulate operation of the HVAC system.

Figure 3:
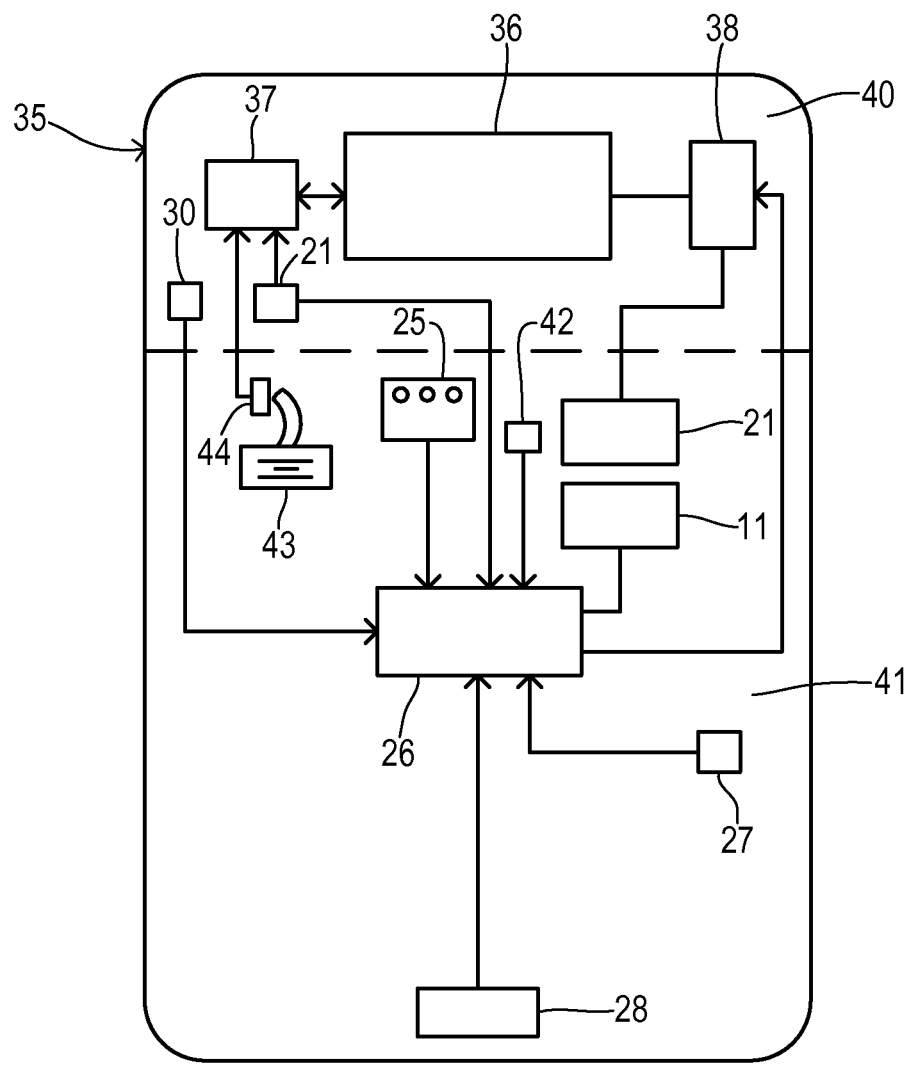
FIG. 3 is a block diagram showing a vehicle configured to employ various embodiments of the present invention.

FIG. 3 shows certain components of a vehicle 35 with a start-stop engine capability as used in the present invention. A combustion engine 36 is equipped with the start-stop feature wherein the engine can be automatically shut off during times when the engine would otherwise be idling (e.g., when vehicle is not moving) and then automatically restarted as necessary when the vehicle begins to move again or when it becomes necessary to operate accessories off of the engine (such as the air conditioning compressor). An engine controller 37 is connected to engine 36 for performing the start-stop functions. Engine 36 drives a compressor 38 which resides in an engine compartment 40 along with engine 36 and controller 37.

Vehicle 35 includes a passenger cabin 41 which contains evaporator 21 and blower 11. Controller 26 is connected to blower 11 for commanding a certain blower speed and to compressor 38 (e.g., for commanding a desired stroke of a variable displacement compressor). Controller 26 is connected to a plurality of sensors and receives other input signals for coordinating operation of the HVAC system, including a vehicle speed sensor 32, ambient temperature sensor 30, internal comfort sensor 23 (which generates signal(s) identifying comfort parameters such as an internal temperature signal and/or an internal humidity signal), an evaporator temperature sensor 42, and sunload sensor 28. HVAC control panel 25 has control elements (e.g. switches) used by the driver or other vehicle occupant to set a desired temperature and/or blower speed for the cooling of vehicle cabin 41.

An automatic stop-event is initiated by engine controller 37 under certain conditions, such as the vehicle slowing to a stop. Such an event can be detected in response in part to the occurrence of a deceleration. In one embodiment, the deceleration is detected by monitoring the position of a brake pedal 43 using an angle/position sensor 44 that provides an angle signal representing the instantaneous brake pedal angle to controller 37.

The decision on whether to initiate a stop event may depend upon whether the HVAC system is turned on and whether it has managed to approach the desired temperature setpoint. For example, if the air conditioning is turned on but the temperature is more than a predetermined number of degrees above the desired setpoint because the HVAC has only been running for a short time, then an auto engine stop event is not initiated even though the vehicle has come to a stop. HVAC controller 26 may be coupled with engine controller 37 via a multiplex bus (not shown) in order to provide the necessary information to make a decision. When the HVAC system is at or near a steady state of operation, then the initiation of an auto stop event would not be prevented.

Once an auto stop event is initiated with the HVAC in air conditioning mode, compressor 38 is no longer driven by the engine. Consequently, evaporator 21 no longer receives cold refrigerant. Nevertheless, evaporator 21 is sufficiently colder than the air of the passenger cabin that it is beneficial to continue to circulate air from the blower and obtain whatever cooling potential may remain. Eventually, however, the evaporator temperature rises to a level at which no cooling of the cabin occurs. Rising temperature causes discomfort for the passengers. Furthermore, increased cabin humidity and a musty odor may result. Therefore, the evaporator temperature has been monitored so that the engine can be restarted before the evaporator temperature becomes too high.

We have discovered that engine off times can be greatly extended if the HVAC system can go into full recirculation mode while the engine is off. Under certain conditions, however, full recirculation would substantially increase the risk of fogging the windshield. In such conditions, it is necessary to continue to follow the basic recirculation strategy which manages a partial recirculation setting in response to humidity and temperature in order to prevent fogging. The goal of the present invention is to detect conditions in which the basic recirculation strategy can be interrupted during an auto stop event by going to a full recirculation setting without significantly raising the fogging probability.

Figure 4:
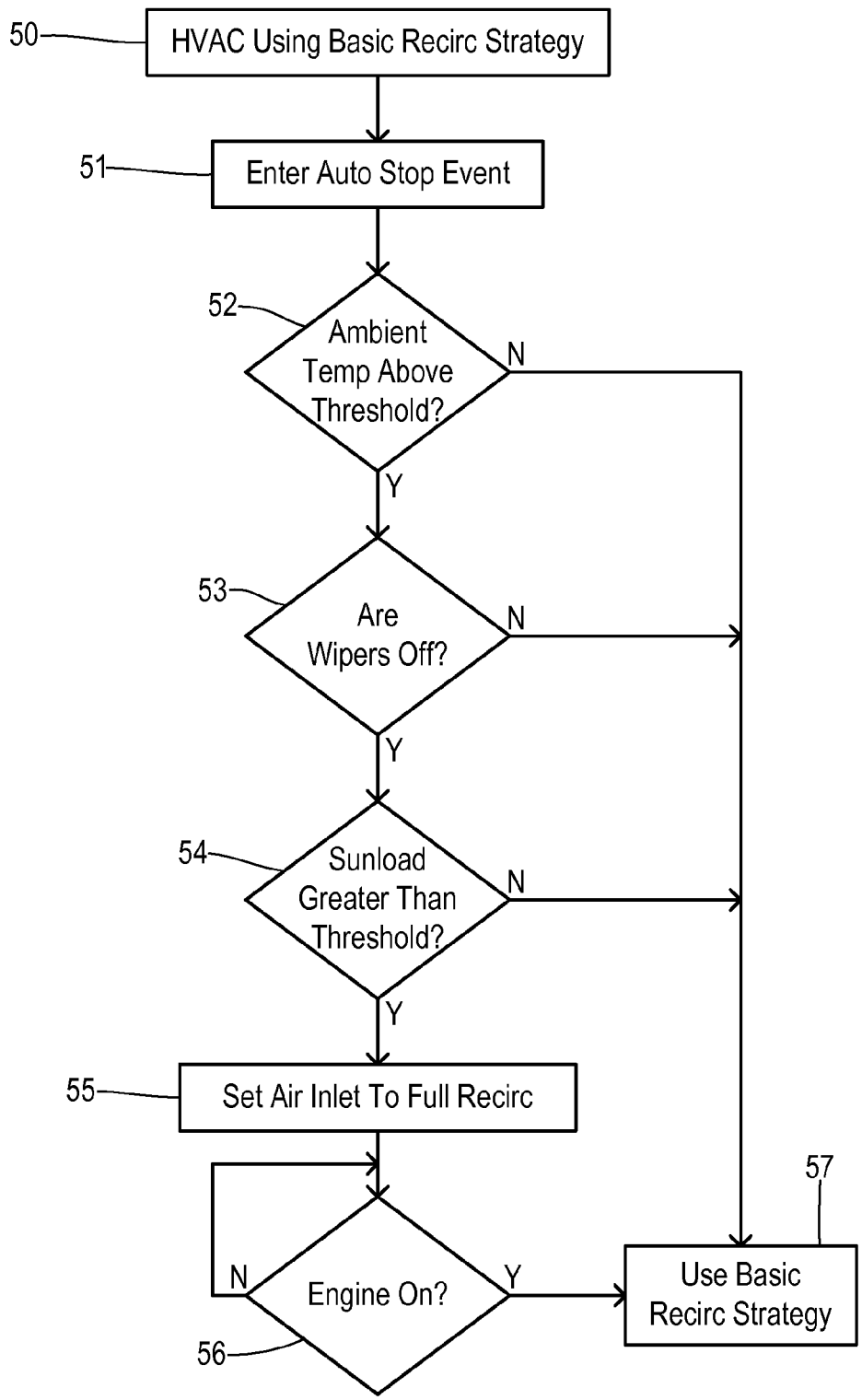
FIG. 4 is a flowchart showing one preferred method of the invention.

In the exemplary embodiment shown in FIG. 4, the HVAC system is using a basic recirculation strategy in step 50, whereby a partial recirculation position of the air return vent is controlled based on humidity and other measured conditions. The vehicle engine enters an auto stop event in step 51, resulting in the air conditioning compressor no longer being driven and a lack of refrigerant flow through the evaporator. The HVAC system begins to conventionally monitor the evaporator temperature and requests an engine restart if the evaporator temperature rises to a predetermined threshold.

To extend the time over which the evaporator remains at below the threshold, a plurality of low fogging probability indicators are examined in order to determine whether to adopt a 100% recirculation position during an auto stop event as follows. In step 52, the measured ambient temperature is compared to a predetermined temperature threshold. The temperature threshold is selected to be a temperature of about 75° F. The threshold may be determined individually for each vehicle design, and may preferably fall somewhere with a range from about 70° F. to about 80° F. An ambient temperature above the selected threshold indicates that the warmth of the ambient air is unlikely to cause window fogging. Thus, if step 52 determines that ambient temperature is not above the threshold, then the basic recirculation strategy continues to be used in step 57.

If ambient temperature is above the threshold in step 52 then to give further confidence that a full recirculation position can be adopted without greatly increasing the chances of fogging, another low fogging probability indicator is examined in step 53 wherein a check is made to determine whether the windshield wipers are turned off. Precipitation such as rain would be accompanied by an increased probability of fogging. Therefore, if the wipers are not off then the basic recirculation strategy continues to be used in step 57. Otherwise, yet another low fogging probability indicator is checked in step 54 wherein a measured sunload is compared with a predetermined sunload threshold. The sunload threshold is selected to correlate to an amount of sunlight at which the radiant energy would sufficiently reduce the ability of fog to form on the windows. If less than that amount of sunlight is present, then the basic recirculation strategy continues to be used in step 57. Otherwise, the air return inlet to the blower is set to the full recirculation position in step 55.

The full recirculation setting may preferably be maintained during the remainder of the auto stop event. A check is made in step 56 to determine whether the engine has turned back on and the auto stop event has terminated. When that occurs, then the method reverts to the basic recirculation strategy in step 57 wherein a partial recirculation setting is determined according to humidity and other factors.

Although it is preferred to use the three simultaneous "low fogging probability indicators" as shown in FIG. 4, it is also possible to make a decision to adopt the full recirculation position using just two of the indicators (especially the ambient temperature and either one of the other indicators).

What is claimed is:

1. A method of controlling a return vent in a vehicular HVAC system with a compressor and a start/stop engine, comprising:
    controlling a recirculation position of the vent according to a basic recirculation strategy;
    entering an auto stop event with the compressor operating; and
    interrupting the basic strategy during the stop event by setting the vent to a full recirculation position in response to a plurality of low fogging probability indicators each being true.

2. The method of claim 1 further comprising the steps of:
    sensing an ambient temperature exterior of the vehicle; and
    sensing a state of a wiper mounted for clearing precipitation from a windshield of the vehicle;
    wherein the plurality of low fogging probability indicators are comprised of a sensed ambient temperature being above a predetermined temperature and the sensed state of the wiper being an off state.

3. The method of claim 1 further comprising the steps of:
    sensing an ambient temperature exterior of the vehicle; and
    sensing a sunload falling on the vehicle;
    wherein the plurality of low fogging probability indicators are comprised of a sensed ambient temperature being above a predetermined temperature and the sensed sunload being above a predetermined sunload.

4. The method of claim 1 further comprising the steps of:
    sensing an ambient temperature exterior of the vehicle;
    sensing a sunload falling on the vehicle; and
    sensing a state of a wiper mounted for clearing precipitation from a windshield of the vehicle;
    wherein the plurality of low fogging probability indicators are comprised of a sensed ambient temperature being above a predetermined temperature, the sensed state of the wiper being an off state, and the sensed sunload being above a predetermined sunload.

5. The method of claim 1 further comprising the step of setting the actuators to a partial recirculation position according to the basic recirculation strategy when the auto stop event terminates.

6. An air conditioning system for a vehicle having a start/stop engine and a passenger cabin, comprising:
- a compressor driven by the start/stop engine;
- an air return vent having a flow regulating device movable to a plurality of recirculation positions for selecting relative proportions of fresh outside air and recirculated air from the passenger cabin;
- an evaporator receiving an air flow from the return vent;
- a temperature sensor for measuring an external ambient temperature; and
- a controller coupled to the air return vent and the temperature sensor for setting the recirculation position according to the steps of:
- setting the recirculation position of the flow regulating device to a partial recirculation position according to a basic recirculation strategy with the engine running;
- detecting an auto stop event of the start/stop engine at a time with the compressor operating; and
- when the auto stop event is detected, then interrupting the basic strategy by setting the recirculation position of the flow regulation device to a full recirculation position in response to a plurality of low fogging probability indicators each being true, wherein the low fogging probability indicators include the measured ambient temperature being above a predetermined temperature.

7. The system of claim 6 further comprising:
- a windshield wiper mounted for clearing precipitation from a windshield of the vehicle;
- wherein the plurality of low fogging probability indicators further includes the wiper being in an off state.

8. The system of claim 6 further comprising:
- a sunload sensor for measuring a sunload falling on the vehicle;
- wherein the plurality of low fogging probability indicators further includes the sensed sunload being above a predetermined sunload.

9. The system of claim 6 further comprising:
- a windshield wiper mounted for clearing precipitation from a windshield of the vehicle; and
- a sunload sensor for measuring a sunload falling on the vehicle;
- wherein the plurality of low fogging probability indicators further includes the wiper being in an off state and the sensed sunload being above a predetermined sunload.

* * * * *